US010878610B1

(12) United States Patent
Wallis

(10) Patent No.: US 10,878,610 B1
(45) Date of Patent: Dec. 29, 2020

(54) GENERATING AN ANIMATION FEATURE FROM LINE DEFORMATIONS

(71) Applicant: Big Fish Games, Inc., Seattle, WA (US)

(72) Inventor: Lyle B. Wallis, Tukwila, WA (US)

(73) Assignee: Big Fish Games, Inc., Seattle, WA (US)

( * ) Notice: Subject to any disclaimer, the term of this patent is extended or adjusted under 35 U.S.C. 154(b) by 0 days.

(21) Appl. No.: 16/586,879

(22) Filed: Sep. 27, 2019

(51) Int. Cl.
| | | |
|---|---|---|
| G06T 13/40 | (2011.01) | |
| G06T 11/20 | (2006.01) | |
| G06T 17/20 | (2006.01) | |
| G06F 3/0488 | (2013.01) | |

(52) U.S. Cl.
CPC .......... G06T 13/40 (2013.01); G06T 11/203 (2013.01); G06T 17/20 (2013.01); G06F 3/0488 (2013.01); G06T 2200/24 (2013.01)

(58) Field of Classification Search
None
See application file for complete search history.

(56) References Cited

U.S. PATENT DOCUMENTS

| | | | | |
|---|---|---|---|---|
| 5,854,634 A | * | 12/1998 | Kroitor | .................. G06T 13/00 345/473 |
| 2018/0130256 A1 | * | 5/2018 | Wampler | ................ G06T 19/20 |
| 2019/0197771 A1 | * | 6/2019 | Batra | ...................... G06T 19/20 |

* cited by examiner

*Primary Examiner* — Jeffrey J Chow
(74) *Attorney, Agent, or Firm* — Lee & Hayes, P.C.

(57) ABSTRACT

An animated feature may include one or more animated lines that comprise a deformation associated with (e.g., layered onto) a flat line image file. A particular animated line may comprise a first, initial shape deforming into a second, end shape. The first shape may comprise a first arrangement of mesh vertices, and the second shape may comprise a second arrangement of mesh vertices that is different than the first arrangement. The first shape and/or the second shape may be determined by on one or more actuations of a control element (e.g., a translation, a rotation, and/or a scaling) associated with the mesh vertices. The animated feature may comprise a single image file of a flat line, stored in a particular memory location, and one or deformations of the initial shape deforming into the end shape applied to the single image file.

20 Claims, 10 Drawing Sheets

US 10,878,610 B1

GENERATING AN ANIMATION FEATURE FROM LINE DEFORMATIONS

BACKGROUND

Gaming animators experience multiple constraints when designing animated characters to have realistic features. The design process for creating convincing animations of two-dimensional characters that appear to move in three-dimensional space requires substantial memory storage. A single character may comprise thousands of individual animation features, and a single game may include thousands of characters. Moreover, once the animation features are designed, graphics engines require substantial computing resources to execute the animation features during gameplay.

One technique for creating animation features with three-dimensional effects includes rigging a deformable mesh layer to a two-dimensional image. For instance, a mesh may be rigged over a two-dimensional image of a cape of a character, so that changes to the mesh shape generate changes to the shape of the two-dimensional image, which may cause the cape to appear to ripple in the wind.

However, this mesh rigging technique has a limited range of motion through which the feature can be animated to move. Large mesh distortions can cause the animated feature to distort in an unrealistic manner, particularly at the edges of the animated feature. Additionally, the size of the two-dimensional image files used in the mesh rigging technique (e.g., the image of the cape) are large files with significant storage requirements, adding to the burden of developing thousands of animation features for a particular character, and the burden of executing the animation features during gameplay.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. Reference numbers may, in some instances, be omitted for ease of readability. The use of the same or similar terms to describe the same or similar features in different figures may indicate similar or identical items, even if a reference number is omitted.

DETAILED DESCRIPTION

Figure 1:
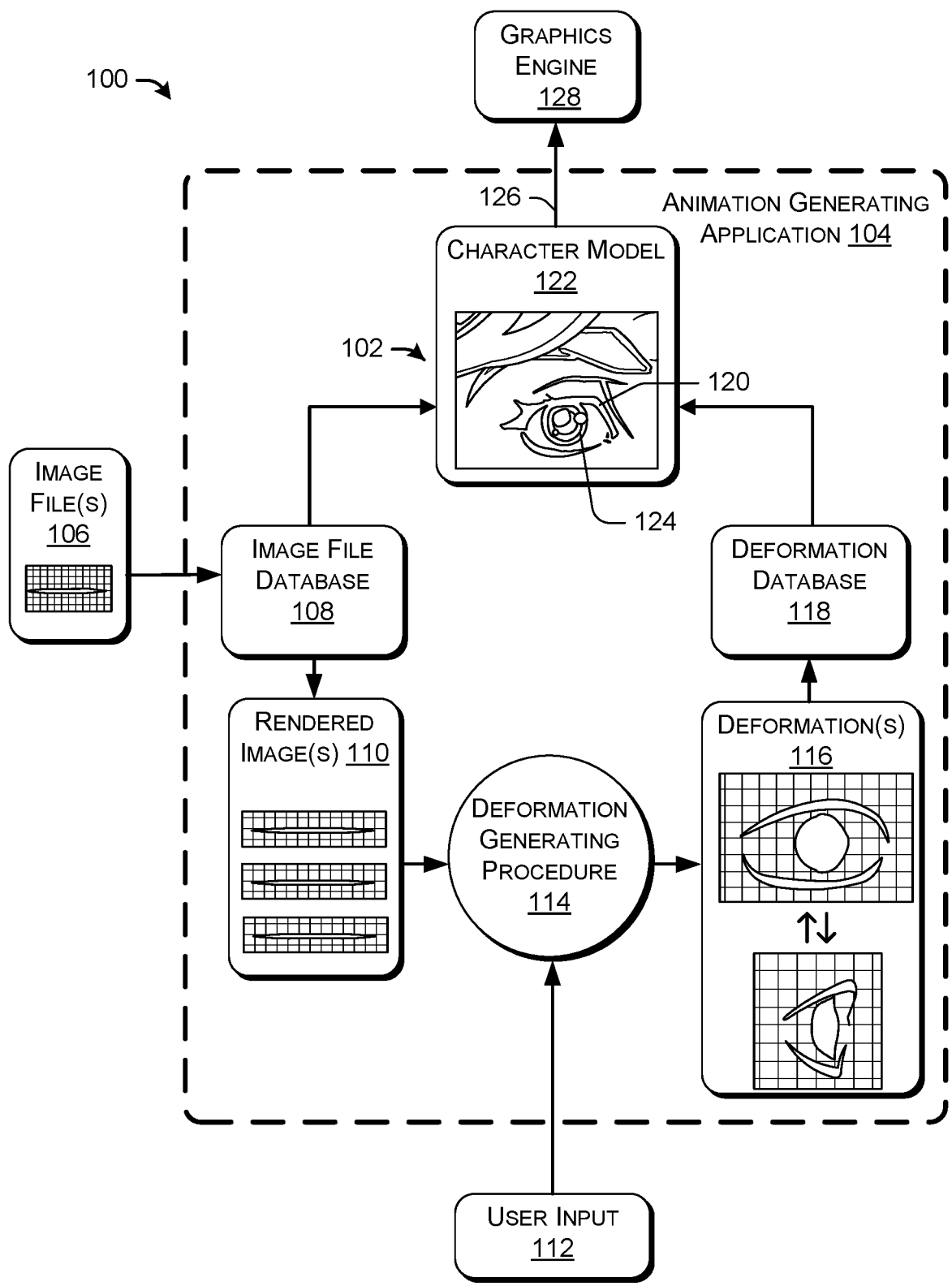
FIG. 1 depicts a schematic diagram of an example system for generating an animation feature from line deformations.

This disclosure is directed to an animation feature comprising one or more animated lines formed by line deformations, which may be generated by methods, systems and/or apparatuses discussed herein. For instance, the animation feature may comprise a first animated line, a second animated line, a third animated line, etc. positioned apart according to one or more coordinates on a character model to form, for instance, an animated facial feature, such as an eye feature.

The animation feature comprised of animated lines may achieve greater resolution with a significantly reduced memory requirement as compared to typical animation features that use a single, large image file. For instance, rather than animating a large image file of an entire face or body part, the animated feature discussed herein may use multiple animations of a single line image, which may be a much smaller file size than the image file of the entire face or body part. Instead of using multiple large image files that have relatively large file sizes, the systems and processes described herein may use the same single line image having a significantly smaller file size. Additionally, using multiple animated lines for the animation feature may provide greater precision and resolution for the animation feature. Accordingly, by generating the animation feature from multiple animated lines rather than from the large image file, the animation feature may achieve significant advantages over typical animation features by requiring less memory and processing power, while increasing the resolution and the effectiveness of a three-dimensional effect.

The one or more animated line(s) may deform from an initial shape into an end shape according to one or more deformation(s). The deformation(s) may be layered onto a flat line image file to form the initial shape and the end shape. In some instances, the flat line image file may comprise a file size substantially greater than a deformation datafile representing the deformation. The animation feature may be generated from multiple animated lines that are, in turn, generated from a single flat image file stored at a single, particular memory location. Multiple animations features, each comprising one or more animated lines, may be generated from the single flat line image stored at the particular memory location. Accordingly, the animation feature may significantly reduce a storage capacity requirement for designing and storing the animation feature compared to existing animation techniques, and may also significantly reduce a processing requirement for developing the animated feature and/or executing the animated feature.

In some examples, the one or more deformations may comprise a first shape (e.g., the initial shape) that deforms into a second shape (e.g. the end shape). The shape(s) may be represented by shape datafile(s) that include a plurality of vertices forming a mesh boundary box. In some instances, the first shape may be represented by a first arrangement or configuration of vertices coordinate values, and the second shape may be represented by a second arrangement of vertices coordinate values. The deformation(s) may be independent of the image file onto which they may be layered, such that a particular deformation may be layered onto multiple, different image files to form multiple, different animated lines and/or multiple, different animation features.

In some embodiments, the one or more shape(s) may be formed (e.g., the plurality of vertices of the mesh boundary box may be determined) via one or more actuation(s) of one or more control element(s) associated with a mesh boundary box. For instance, a particular control element may be associated with a particular subset of vertices of the mesh boundary box. The mesh boundary box may be layered onto a rendered flat image of a line, so that a portion of the line is at least partially surrounded by the subset of vertices and is, therefore, distorted according to the one or more actuations of the particular control element. Accordingly, multiple deformations representing multiple animated lines of the animated feature may be generated from a single image file of a flat line (e.g., a "flat line image file"). An entire animated feature may be generated from the single flat line image file.

In some examples, one or more animated line(s) may be arranged at particular coordinates (e.g., first coordinates for the first animated line, second coordinates for the second animated line, etc.) on a character model to form the animated feature. For instance, the animated line(s) may form a portion of the animated facial feature, e.g., the eye feature, by defining one or more shadows or edges of the animated facial feature. The first animated line may form un upper eyelid portion of the eye feature, the second animated line may form a middle iris/pupil portion of the eye feature, and the third animated line may form a lower eyelid portion. Accordingly, the animation feature may comprise the eye feature, constructed from animated two-dimensional line images, appearing to rotate in a three-dimensional space, e.g., rotating about a y-axis. In some examples, the animation feature generated from animated lines may comprise an automatically generated intermediate shape, and/or may result in a higher resolution and smoother animation, in some instances, based on the animation feature comprising multiple animations of a single line image file.

FIG. 1 depicts an example system 100 for generating an animation feature 102, for instance, via an animation generating application 104. The animation generating application 104 may comprise developer software, such as Spine®, for designing animated characters for video games. The system 100 may include an image file 106 comprising a file type that may represent one or more pixel values associated with one or more pixel locations such as a Portable Network Graphics (PNG) file, Joint Photographic Experts Group (JPEG) file, JPEG File Interchange Format (JFIF) file, Tagged Image File Format (TIFF) file, and/or Graphics Interchange Format (GIF) file. The system may store the image file 106 in an image file database 108. The image file database 108 may comprise a database of the animation generating application 104 for storing uploaded image files 106 so that the image file 106 may be rendered, via the animation generating application 104, into one or more rendered image(s) 110. The rendered image(s) 110 may comprise a visual representation of the data represented by the image file 106, for instance on a display, so that a user (e.g., an animator) may work with the image file 106 to create the animation feature 104.

In some examples, a user input 112 may be provided as part of a deformation generating procedure 114. The deformation generating procedure 114 may comprise one or more techniques for generating one or more deformation(s) 116 (discussed in greater detail below regarding FIGS. 3A-8). The one or more deformation(s) 116 may comprise data representing a transformation from a first shape into a second shape, wherein the first shape comprises a first arrangement of vertices and the second shape comprises a second arrangement of vertices. The one or more deformation(s) 116 may be independent of the image file 106 such that a particular deformation 116 may be applied to multiple of the image files 106. Conversely, a single image file 106 may be used multiple times with multiple of the deformations 106. The ability to use stored deformation(s) 116 and/or stored image file(s) 106 multiple times may conserve memory space.

In some embodiments, the deformation(s) 116 may be stored in a deformation database 118. In some examples, an association of the deformation(s) 116 with the image file 106 may be stored in the deformation database 118, or the deformation(s) 116 may be stored independent from the association with the image file 106. The deformation database 118 and other databases of the system 100 are discussed in greater detail below regarding FIG. 7.

In some examples, a first animated line 120 may be formed by uploading the image file 106 from the image file database 108, uploading a first of the deformation(s) 116 from the deformation database 118, and associating the image file 106 with the first of the deformation(s) 116. The first animated line 120 may be associated with or stacked onto a character model 122. The character model 122 may comprise a displayed representation of any type of three-dimensional figure or object to be displayed on a two-dimensional surface as having three-dimensional features, such as a person, an animal, a creature, a robot, an object forming a part of an interactive environment, a background object, a user interface element, or combinations thereof. The character model 122 may provide an interactive canvas for the developer to manipulate and control while developing the animation feature 102. The character model 122 may operate in an idle mode such that the animation feature 102 layered onto the character model may be executed in real-time, providing an example of the animation feature 102 to a user. In some examples, the first animated line may be positioned at first coordinates on the character model 122. The first coordinates may indicate a position on the character model 122 that may comprise a fixed location or a dynamic location, such as a bone association of an animation skeleton.

In some examples, a second animated line 124 may be formed by uploading the same image file 106 from the image file database 108, uploading a second of the deformation(s) 116, and associating the image file 106 with the second of the deformation(s) 116. Using the same image file 106 for the second animated line 124 in addition to the first animated line 120 may result in a significant memory requirement reduction for generating the animation feature 120. The second animated line 124 may be associated with or stacked onto the character model 122, for instance, at second coordinates on the character model 122. The second coordinates may be at a location on the character model 122 that is at least partially spaced apart from the first coordinates. For instance, the second animated line 124 may be positioned relative to the first animated line 120 such that at least a portion of both the second animated line 124 and the first animated line 120 are visible. In some examples, positions of the first animated line 120 and the second animated line 124 (e.g., as determined by the first coordinates and the second coordinates) may create the animation features 102, such as an animated facial feature. The animated facial feature may comprise an eye, a nose, a mouth, a cheekbone, a side or edge of an object, etc. The positions of the first animated line 120 and the second animated line 124 on the character model 122, and/or the one or more animation features 102 (e.g., facial features that appear to move in three-dimensional space displayed on a two-dimensional surface) created by a particular positioning of one or more animated lines, are discussed in greater detail below regarding FIGS. 4-7 and 9.

In some examples, the animation generating application 104 may generate and/or output an animation feature datafile 126 representing the animation feature 102, such as a JSON file. Upon execution of the animation feature datafile 126, e.g., by a graphics engine 128 and/or a game engine, the first animated line 120, the second animated line 124, and/or another animated line (e.g., a third animated, a fourth animated line, and/or a fifth animated line) may transform according to the deformation(s) 116 associated with the respective animated line(s). That is, the animated line(s) 120 and/or 124 may comprise at least a first shape deforming into a second shape, which may cause the animation feature 102 to appear to move in three-dimensional space, and/or otherwise change a shape or an expression, as discussed in greater detail below regarding FIGS. 4-6 and 9.

The system 100 may comprise one or more combinations of algorithmic software modules and/or hardware modules to perform the steps, methods, and/or operations of this disclosure, as discussed in greater detail below regarding FIG. 2.

Figure 2:
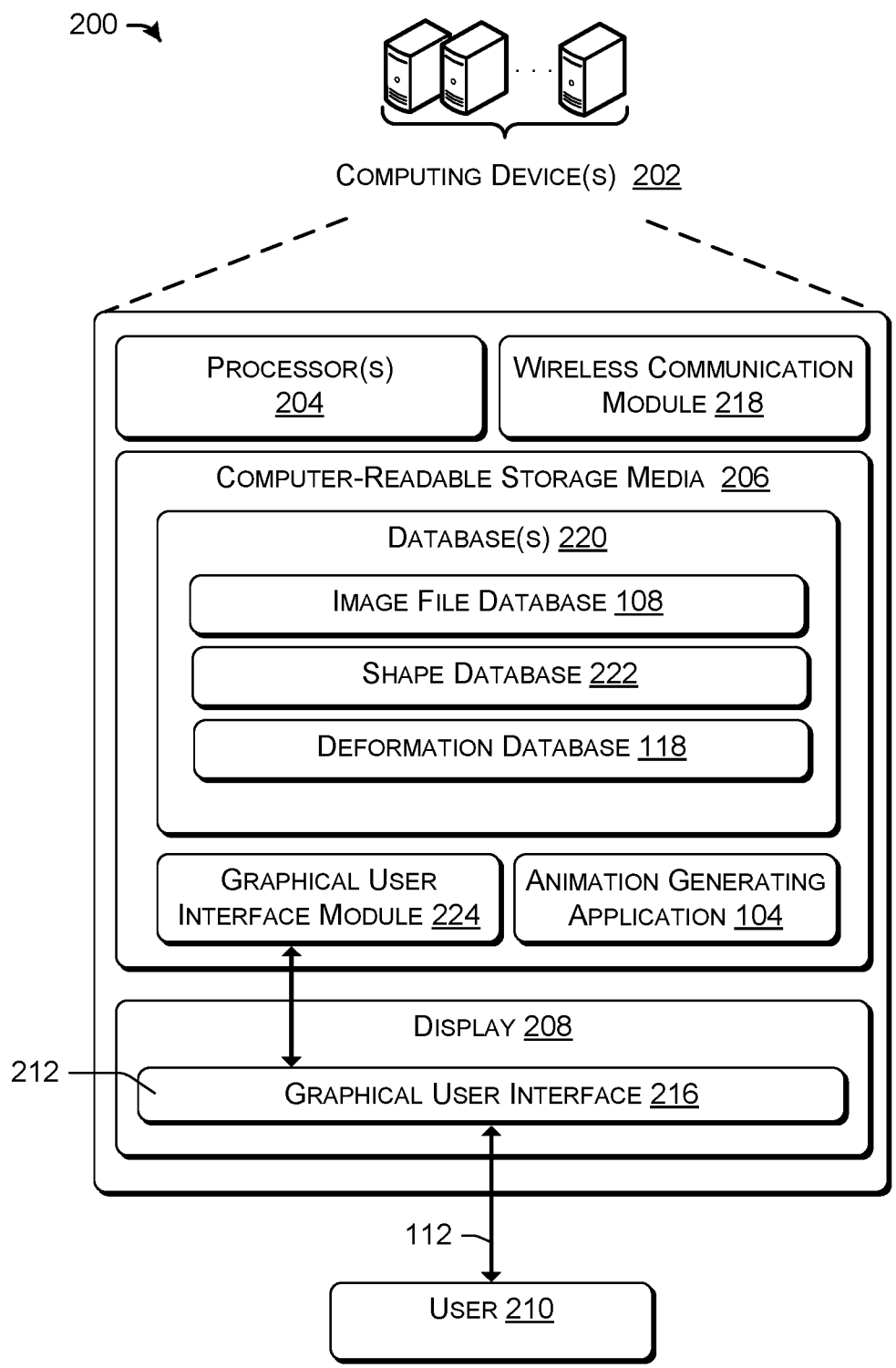
FIG. 2 depicts a schematic diagram of an example system including a computing device, which may form at least a portion of the system depicted in FIG. 1.

FIG. 2 illustrates an example system 200, which may be similar to, identical to, and/or form a portion of any of the systems disclosed herein. For instance, FIG. 2 illustrates a computing device 202 which may comprise one or more software and/or hardware components for at least executing the animation generating application 104, receiving the user input 112, and/or generating the animation feature 102.

In some examples, the computing device 202 may comprise one or more processors(s) 204 that may execute computer-readable instructions stored on one more computer-readable storage media 206 (e.g., memory devices). The computer-readable instructions may comprise software algorithms, e.g., represented by object code, that, when executed by the processor(s) 204, performs one or more of the processes disclosed herein. In some examples, the computing device 202 may comprise a display 208 for presenting information, e.g., of the system 100, to a user 210. The computing device 202 may comprise a user input receiver 212 for receiving the user input 112 from the user 210, e.g., via a graphical user interface 216. In some examples, the computing device 202 may comprises a wireless communication module 218. The components 202-218 of the computing device 202 are defined in greater detail below.

In some embodiments, the computing device 202 may comprise a local computing device such as a mobile phone device (e.g., smartphone), a laptop computer, a desktop computer, a wearable-computing device (e.g., glasses, watch, necklace, etc.), a stand-alone computer (e.g., raspberry pi, an external drive, etc.), an electronic book (eBook) reader device, a gaming console, a tablet computing device, or combinations thereof. The computing device 202 and/or one or more components of the computing device 202 may comprise a remote computing device such as one or more server devices, which may be located a distance apart from other components of the computing device 202 (e.g., in a different data center, city, state, country, etc.), one or more local computing devices, or combinations thereof. In some embodiments, one or more components of the computing device 202 discussed herein may be assembled together at a single physical location, for instance, within a housing.

In some examples, the one or more processor(s) 204 may comprise a microprocessor, a microcomputer, a microcontroller, a digital signal processor, a central processing unit (CPU), a graphics processing unit (GPU), a quantum processor, etc. Among other capabilities, the one or more processor(s) may operate to fetch and execute computer-readable instructions stored in the one or more memory device(s) to perform the operations disclosed herein.

In some embodiments, the one or more computer-readable storage media 206 may comprise non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), field-programmable gate arrays (FPGA), digital versatile discs (DVD) or other optical storage, magnetic cassettes, magnetic tape, magnetic disk storage or other magnetic storage devices, a quantum-state storage device, or other medium that can be used to store information for access by an electronic device.

In some examples, the computer-readable storage media 206 may store one or more database(s) 220, such as the image file database 108, a shape database 222, the deformation database 118, and/or combinations thereof. The image file database 108 may receive and store image files 106 such as a file type comprising PNG, JPEG, JFIF, TIFF, GIF, BMP, etc. The shape database 222 may receive and store one or more shape datafiles, which may represent one or more shapes. A shape of the one or more shapes may comprise a vector positioning arrangement associated with a mesh layered onto the rendered image 110. For instance, the vector positioning arrangement may be generated by one or more actuations of one or more control elements, as discussed in greater detail below regarding FIGS. 3A and 3B. The deformation database 118 may receive and store one or more deformation datafiles. A deformation datafile of the one or more deformation datafiles may represent the deformation 110 including an association of a first shape (e.g., as represented by a first shape datafile) with a second shape (e.g., as represented by a second shape datafile), such that layering the deformation 110 onto the image file 106 generates an animation of an image or bitmap represented by the image file 106 deforming from the first shape into the second shape. In some examples, the deformation datafile may include a timing parameter that indicates a duration of time for the deformation 110 to occur. In some instances, the duration of the deformation 110 may be provided after generating the animation feature datafile 126, e.g., by the graphics engine 128, or the deformation 110 may omit the timing parameter. The one or more database(s) 220 and data stored in the one or more database(s) 220 are discussed in greater detail below regarding FIGS. 3-8.

In some instances, the computer-readable storage media 206 may store the animation generating application 104, for instance, as one or more software algorithm modules, one or more hardware modules, and/or combinations thereof. For instance, the animation generating application 104 may comprise software products such as Spine®, CreativeStudio™, Flash, Adobe® After Effects, etc.

In some examples, the display 208 may comprise an interface for presenting information, e.g., of the system 100, which may be generated by the animation generating application 104, to the user 210. For instance, the display 208 may comprise a visual display such as a screen (e.g., of a mobile device, wearable-computing device, tablet device, laptop computer, etc.), monitor (e.g., of a desktop computer, server device, etc.), projector, laser display, television, etc.) The display 208 may present the graphical user interface 216, for instance, generated or otherwise controlled via a graphical user interface module 224 stored on the computer-readable storage media 206 and/or executed by the processor(s) 204. In some instances, the display 208 may comprise the visual display, a flexible display, a projector, etc.

In some embodiments, the user input receiver 212 may comprise a physical component for receiving information via the user input 112 from the user 210. For instance, the user input 112 may comprise a tactile, pressure, audio (e.g., verbal), physical motion-based, other physical actuation, and/or combinations thereof generated by the user 210. The user input receiver 212 may comprise a keyboard, a mouse, a touch pad, a screen or monitor (for instance, the user input receiver 212 may comprise the display 208 and/or the graphical user interface 216), a motion detector (e.g., a light-interference detector), a microphone, another device for detecting the user input 112, and/or combinations thereof.

In some examples, the wireless communication module 218 may comprise one or more software and/or hardware components of the computing device(s) 202 for establishing a communication session, e.g., between a first computing device and a second computing device via a network. For instance, the wireless communication module 218 may comprise a Wi-Fi transceiver that establishes a Wi-Fi connection with a router that, in turn, establishes a TCP/IP connection with a server device. In some instances, a transceiver/cellular modem operating under control of the processor(s) 204 via a communications software module may establish a radio access network (RAN) communication session with the server device. The wireless communication module 218 may comprise other hardware/software components and/or communication protocols for sending information from one computer-readable storage media of the computing device 206 to another computer-readable storage media. In some examples, the computing device 202 may comprise a wireline communication module for establishing a wireline communication session (e.g., via fiber optic cables, copper cables, power line communication, etc.) in addition to or alternatively to the wireless communication module 218.

In some embodiments, the computing device 202 may comprise a combination of multiple computing devices, e.g., a local computing device and a remote computing device (which may be similar to, identical to, or different from computing device 202) in communication with each other. For instance, the computing device 202 may comprise a first computing device and a second computing device. The first computing device may comprise a desktop computer including any of the one or more components discussed herein, and the second computing device 202 may comprise a server device including any of the one or more components discussed herein. The first computing device 202 may execute wireless communication with the second computing device 202 to perform one or more steps or operations discussed herein.

Figure 3A:
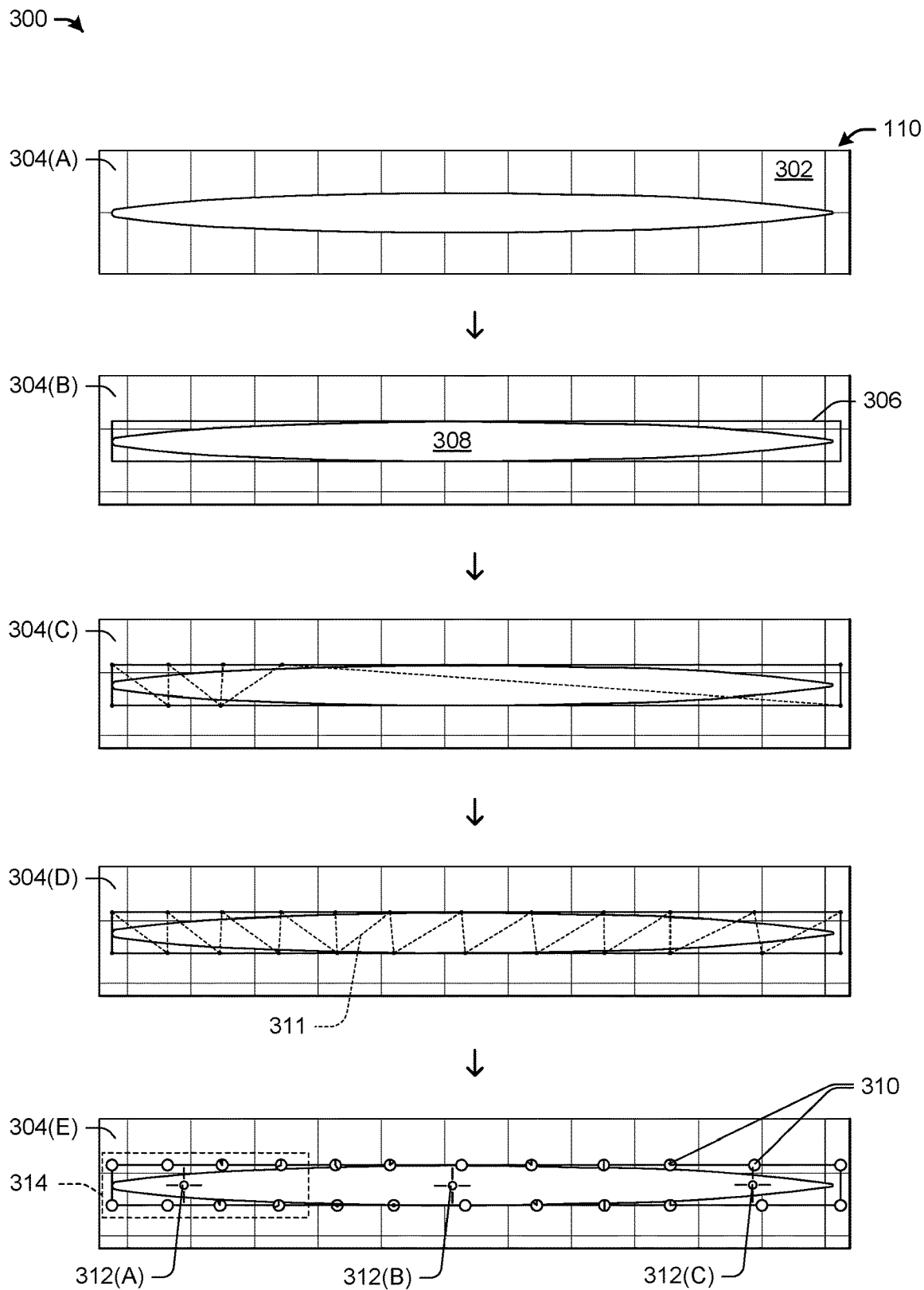
FIG. 3A depicts multiple example presentations of a graphical user interface representing an example deformation generating procedure, including associating a mesh with a line bitmap, which may form at least a portion of the system depicted in FIG. 1.
Figure 3B:
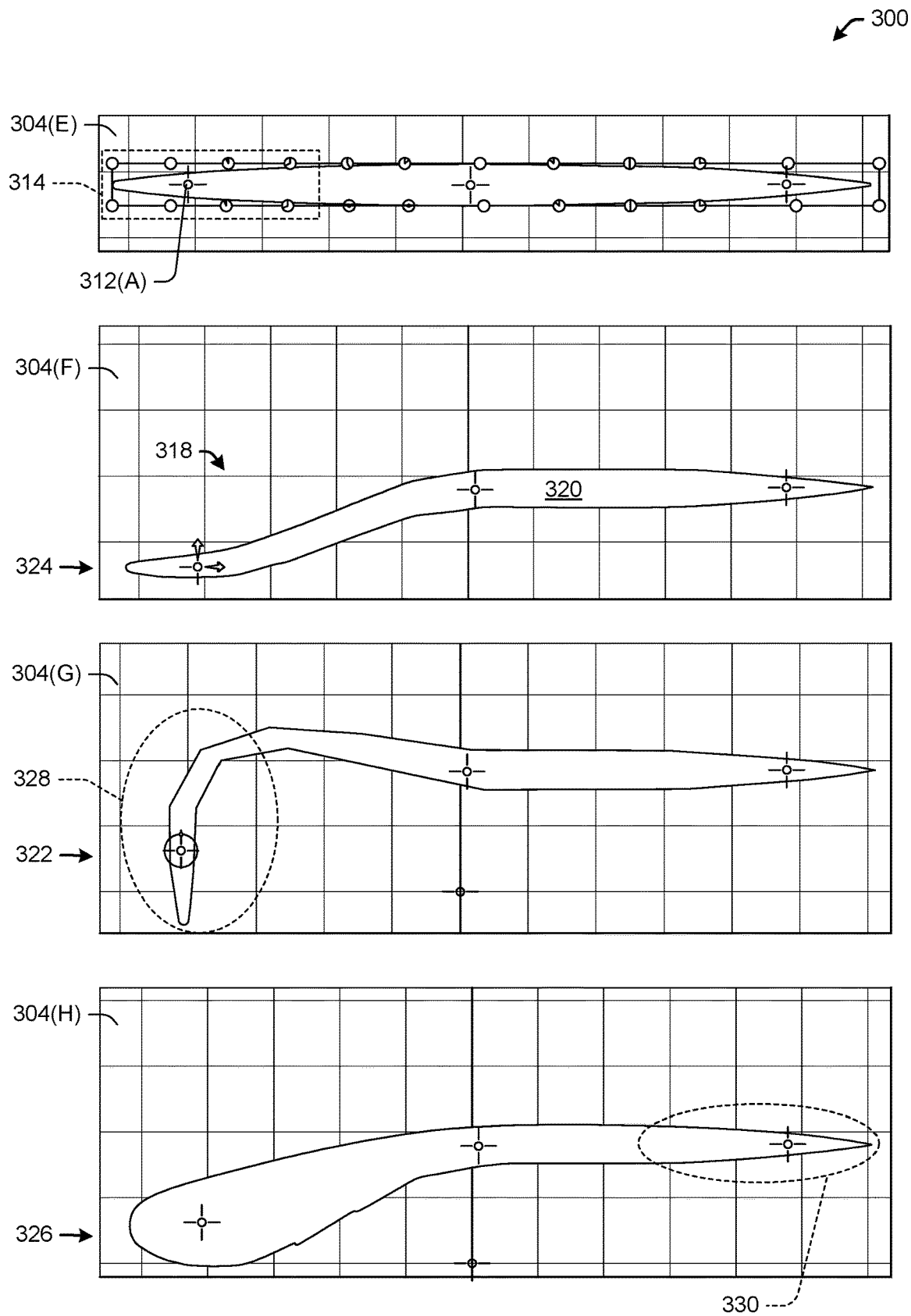
FIG. 3B depicts multiple example presentations of a graphical user interface representing at least a portion of an example deformation generating procedure, including actuating a control element associated with the mesh, which may form at least a portion of the system depicted in FIG. 1.

FIGS. 3A and 3B depict examples of a system 300, which may be similar to, identical to, and/or form a portion of any of the systems disclosed herein. For instance, FIGS. 3A and 3B illustrate portions of the deformation generating procedure 114. FIG. 3A depicts techniques for rigging a mesh to the rendered image 110 (illustrated by a plurality of graphical user interface presentations 304(A)-(E)). FIG. 3B depicts manipulations of the mesh once it has been rigged to the rendered image, via control element actuations, that result in distortions of the rendered image 110 and outputting a shape datafile representing the distortions.

In some examples, the system 300 may include the image file 106, which may be received by the animation generating application 104 and rendered into the one or more rendered image(s) 110, e.g., on the display 208. For instance, the rendered image 110 may be displayed in a developer preview window 302 of the animation generating application 104. The developer preview window 302 may comprise a graphical user interface section in which the character model 120 is displayed with the animation feature 102, providing a developer a preview the animation feature 102 during a developing process.

In some embodiments, a mesh 306 may be associated with the rendered image 110. The mesh 306 may comprise a boundary box that substantially, or at least partly, surrounds a line bitmap 308. The line bitmap 308 may comprise an underlying data structure of the image file 106 representing a mapping of pixel values to particular pixel coordinates. The pixel values may represent colors displayed on a screen when the line bitmap 308 is displayed as the rendered image 110, and in a Red-Green-Blue (RGB) scheme, may comprise a first value between 0 and 255 corresponding to red, a second pixel value between 0 and 255 corresponding to green, and a third pixel value between 0 and 255 corresponding to blue. An example line bitmap may comprise: (0,0), R:0, G:0, B:0; (1,0), R:0, G:0, B:0; (2,0), R:25, G:47, B:220; (3,0) R:25, G:47, B:220 etc. The line bitmap 308 may comprise a list (e.g., a comma-separated values (CSV) file). A portion of the line bitmap 308 may represent a flat line shape via a particular set of common or related pixel values for the particular set of coordinates defining the flat line shape. In some instances, the mesh 306 may be visually represented on the graphical user interface 216 as a different color (i.e., set of pixel values), a different line weight, and/or a different line style than that of the line bitmap 308. The mesh 306 may comprise a rectangular shape, a square shape, a circle shape, an elliptical shape, or another shape that at least partially or substantially surrounds or outlines the rendered image 110.

In some examples, the mesh 306 may comprise one or more vertices 310, e.g., connecting one or more vectors 311 that define the mesh 306. The vertices 310 may comprise points distributed (e.g., substantially evenly) along the mesh 306, e.g., along the outer boundary line of the mesh 306, and the vertices 310 may divide up the mesh 306 into discrete portions. The mesh 306 may, in particular instances, comprise an amount of vertices 310 based at least in part on a shape or size of the rendered image 110. For instance, the amount of vertices 310 may comprise any number between at least about two and about fifty, such as four, five, six, seven, eight, nine, ten, twelve, fourteen, sixteen, eighteen, twenty, etc. The amount of vertices 310 may comprise an amount under 50, under 40, under 30, under 20, under 10, under 8, under 6, under 4, etc.

In some examples, the mesh 306 may be associated with the rendered image 110. The association of the mesh 306 to the rendered image 110 may comprise dividing the line bitmap 308 of the rendered image 110 into discrete polygonal units (e.g., triangles, squares, rhombuses, etc.), and mapping coordinates of the vertices 310 to coordinates of the polygonal units. A number of the discrete polygonal units may be based on a predetermined or desired resolution of the animation feature 102. The mapping may be stored in a bitmap mapping matrix.

The association of the mesh 306 to the rendered image 110 may further map how coordinates of the vertices 310 undergo a change in position with respect to each other, and apply the change in position onto the line bitmap 308 via a linear transformation matrix applied to the bitmap mapping matrix. Accordingly, a distortion of a particular section the mesh (e.g., generated by the user input 112) may cause a corresponding distortion to a particular section of the line bitmap 308 at least partially enclosed by the particular section of the mesh.

In some instances, the mesh 306 may comprise one or more control element(s) 312(A)-(C), which may be associated with one or more subset(s) of the one or more vertices 310 in order to create the distortion. The control element(s) 312(A)-(C) may be presented on the display 208, and may be actuatable, for instance, as a selectable, moveable, togglable, or otherwise interactable icon, or as a text input field, presented via the graphical user interface 216. In some instances, the control element(s) 312(A)-(C) may be actuatable by the user input 112. An actuation of the control element(s) 312(A)-(C) may generate the linear transformation matrix. For instance, the user input 112 may have a magnitude (e.g., a distance of swipe on a touch screen, a value of a number into a text field, a distance of sliding a bar, etc.), which generates a corresponding linear transformation matrix value. The corresponding linear transformation matrix value may be determined, at least in part, on the user input 112 selecting a type of actuation (e.g., translation, rotation, or scaling).

FIG. 3B depicts examples of the system 300, which may be similar to, identical to, and/or form a portion of any of the systems disclosed herein. For instance, FIG. 3B depicts a shape generating procedure to generate one or more shapes from which, in some instances, one or more deformations may be generated. The one or more shapes are illustrated by a plurality of graphical user interface presentations 304(E)-(H)). In some examples, the system 300 may include the rendered image 110 associated with the mesh 306, e.g., having undergone the mesh rigging procedure depicted in FIG. 3A.

In some examples, the vertices 310 may experience and thus include a position change 318, which may correspond to the actuation of the control element(s) 312(A)-(C). The line bitmap 308 may undergo a corresponding transformation or distortion which matches the position change 318 of the mesh 306 layered onto the line bitmap 308. As such, one or more shapes 320 may be generated from the rendered line image 110, for instance, via the one or more position changes 318 of the vertices 310. For example, the actuation causing the position change 318 may comprise a rotation actuation 322, a translate actuation 324, or a scale actuation 326, discussed below.

In some instances, the user input 112 may select the rotation actuation 322 which may cause the vertices 310 associated with the actuated control element to rotate an angle θ about a z-axis. An angular direction (e.g., a positive value corresponding to a clockwise rotation, or a negative value corresponding to counter-clockwise rotation) may be determined based on the user input 112, e.g., a direction of a swipe, checking a box, etc. Selecting the rotation actuation 322 may generate, for instance, a 2×2 linear transformation matrix comprising a first row having values of (cos θ, sin θ) and a second row having values of (−sin θ, cos θ), with θ corresponding to the magnitude of the user input 112 and/or actuation.

Upon experiencing the rotation actuation 322, for instance, the subset of vertices (e.g., subset 314) may undergo the position change 318, which may comprise a rotation corresponding to the rotation actuation 322 at the control element (e.g. control element 312(A)) and associated with the subset 314. A first portion 328 of the line bitmap 308 may rotate an amount corresponding to a degree of the rotation actuation 322 of the subset 314 (e.g., a magnitude of θ), such that the line bitmap 308 distorts by a rotation of the first portion 328.

In some examples, the user input 112 may select the translate actuation 324 which may cause the subset 314 of vertices 310 associated with the actuated control element to shift an amount corresponding to a translation factor k in a particular direction (e.g., in the x-direction and/or in the y-direction). Selecting the translate actuation 324 may generate, for instance, a 2×2 linear transformation matrix comprising a first row having values of (k, 0) and a second row having values of (0, k), with k corresponding to the magnitude of the user input 112 and/or actuation.

For instance, the translate actuation 324 may correspond to a translation of the first portion 328. For instance, the first portion 328 may shift a distance having a horizontal component and/or a vertical component. The distance may correspond to the amplitude of the user input 112 (e.g., the k value), or other input, providing the translate actuation 324 at the control element 312(A) that, in turn, corresponds to a shifting distance of the subset 314 of the one or more vertices 310 of the mesh 306.

In some examples, the user input 112 may select the scale actuation 326 which may uniformly increase or decrease a distance of the subset 314 of vertices 310 from the x-axis and/or the y-axis in a direction (e.g., the x-direction and/or the y-direction). Selecting the scale actuation 326 (e.g., in the x-direction) may generate, for instance, a first 2×2 linear transformation matrix comprising a first row having values of (k, 0) and a second row having values of (0, 1), with k comprising a magnitude of the user input 112 and/or the actuation. Selecting the scale actuation 326 (e.g., in the y-direction) may generate, for instance, a second 2×2 linear transformation matrix comprising a first row having values of (1, 0) and a second row having values of (0, k) with k corresponding to the magnitude of the user input 112 and/or actuation. Selecting the scale actuation 326 to include both an x-component and a y-component may generate a third 2×2 linear transformation matrix comprising a sum of the first 2×2 linear transformation matrix and the second 2×2 linear transformation matrix.

In other words, as illustrated in FIG. 3B, the scale actuation 326 may be associated with an expansion of an area at least partially bound by the subset 314, and/or an increase in one or more line segment lengths connecting one or more vertices of the subset 314, for instance across the line bitmap 308. An amplitude of the expansion and/or the increase may correspond to an amplitude of the user input 112 (e.g., a value of k), or other input, providing the scale actuation 326 at the control element that, in turn corresponds to an amount of scaling of the subset 314 of the one or more vertices 310 of the mesh 306.

In some embodiments multiple portions of the line bitmap 308 may undergo multiple transformations. For instance, in addition to or as an alternative to actuating the first control element 312(A) associated with the first subset 314 (e.g., that controls changes to the first portion 328 at a first end of the line bitmap 308), an actuation of a second control element 312(B) may correspond to distortions or transformations of a second portion, e.g., at a middle of the line bitmap 308, and/or a third portion, e.g., at a second end of the line bitmap 308. The association of particular subsets, e.g., 314, to particular control elements, e.g., 312(A) may be indicated via particular colors.

In some examples, the user 210 (e.g., a game animator or developer) may associate the mesh 308 with the line bitmap 308 to provide a tool, layered over the line bitmap 308, for manipulating and/or deforming the line bitmap 308, one section at a time, via the control elements 312. For instance, the user 210 may upload the image file 106 so that the image file 106 is displayed as the rendered image 110 of the line bitmap 308. The user 210 may generate a mesh of 24 vertices, the number of vertices being based on a number of pixels of the line bitmap 308. The mesh may be displayed as a rectangular border (e.g., boundary box) of evenly distributed dots (e.g., representing the vertices) surrounding the line bitmap 308. The user 210 may cause the mesh 308 to evenly divide into three sections (or more or less sections, which may be determined by the user input 112), the three sections being associated with corresponding three control elements. A left section of the mesh including a first subset of vertices, for instance eight vertices, may overlay/partially surround a left section of the line bitmap 308 and may be associated with a first control element. A middle section of the mesh including a second subset of vertices, for instance eight vertices, may overlay/partially surround a middle section of the line bitmap 308 and may be associated with a second control element. A right section of the mesh including a third subset of vertices, for instance eight vertices, may overlay/partially surround a right section of the line bitmap 308 and may be associated with the third control element. Accordingly, the line bitmap 308 may be prepared for manipulation/deformation at a granular level based on the number of vertices, control elements, and actuations of the control elements.

In some examples, upon associating the mesh 308 with the line bitmap 308, one or more portions of the line bitmap 308 may be distorted via one or more actuations of the control element(s) 312. In some instances, a shape may be generated by keyframing the line bitmap 308 with inclusion of the actuations, and corresponding distortions (e.g., rotations, translations, and/or scalings). In some examples, the shape may include the actuations, or the shape may include a subset of the actuations, layered onto the rendered image 110. Upon keyframing the line bitmap 308 with the layered actuations, a shape datafile may be generated to represent a particular arrangement of the one or more vertices 310 (e.g., as plotted on an x-y coordinate plane) corresponding to the actuations. The shape datafile may be stored in the shape database 222 and may be associated with a shape datafile identifier, such as "first eye line," "top of eye," "bottom of eye," "middle of eye" "first nose line," "bottom of nose," and so on. In some instances the shape datafile identifier may correspond to a portion of the animation feature 102 that the shape datafile represents, e.g., a portion of a shadow shape cast by the animation feature 102, or an edge contrast shape, such as a portion of background contrasting with a portion of foreground, e.g., the foreground being disposed on the character model 122, for instance, as an animated facial feature of the character model 122.

In some instance, the animation feature 102 may comprise an animated facial feature may of a human, animal, and/or robot, such as one or more of eyes, noses, mouths, ears, forehead creases, brow lines, hair, eyebrow, lips, teeth, arms, hands, fingers, legs, feet, toes, combinations thereof, etc. The animated facial feature may comprise animal, or even fantastical features, such as horns, tusks, snouts, spikes, claws, beaks, feathers, antlers, antenna, snappers, fins, combinations thereof, etc. In some examples, the animation feature 102 may comprise an object or a portion of an object that forming at least a part of a three-dimensional environment displayed on a two-dimensional surface. The animation feature 102 may comprise at least a portion of an interactive object of the environment, or any other object or figure to be presented on the two-dimensional surface as having three-dimensional traits.

In some examples, the position changes 318 to vertices 310 may be determined based at least partly on a source other than the user input 112, such as a previously-stored shape file, and/or an output of another program or application in communication with the animation generating application 104 (e.g., a machine-learning algorithm that extracts one or more shapes from a training data set). Accordingly, one or more shapes may be based at least in part on the user input 112 and/or the source other than the user input 112.

In some examples, the line bitmap 308 may represent a line having a length value and a width value, such that the line comprises a two-dimensional area. That is, the line represented by the line bitmap 308 of the rendered image 110 may, in some instances, not comprise a "line" in a mathematical or geometrical sense (e.g., an infinite set of one-dimensional points whose coordinates satisfy a particular linear equation), but rather a "line" in an aesthetic sense, e.g., a unit of composition, a unit of color (e.g., a predetermined pixel value for a subset of pixel locations defined by a two-dimensional area), a digital brush stroke, etc. In some examples, the length value may be greater than the width value, e.g., marginally greater or substantially greater than the width value, such as at least double, at least triple, at least four times, at least five times, at least one or more orders of magnitude greater than the width value, etc. In some examples, the line as disclosed herein may comprise a circle or a square. Examples of particular deformations of the first line length into the second line length, the third line length into the fourth line length, etc., are described in greater detail below regarding FIGS. 5-7.

In some examples, the rendered image 110 may comprise one or more profile features forming the line bitmap 308, such as a taper 330 at the first end and/or the second end of the line bitmap 308. For example, the taper 330 may comprise a triangular shaped end, and/or a width dimension that decreases to zero at a terminating point, which may be along a center axis of the line, or off-center from the center axis. In some instances, the profile feature disposed at least one of the ends of the line bitmap 308 may comprise at least one of the taper 330, a slanted edge, a rounded edge, a sawtooth edge, a step-function edge, a faded edge, etc. In some instances, the taper 330 (or other profile features) may provide a particular aesthetic effect for representing a shadow or an edge, especially when the shadow or edge undergoes the deformation(s).

Figure 4:
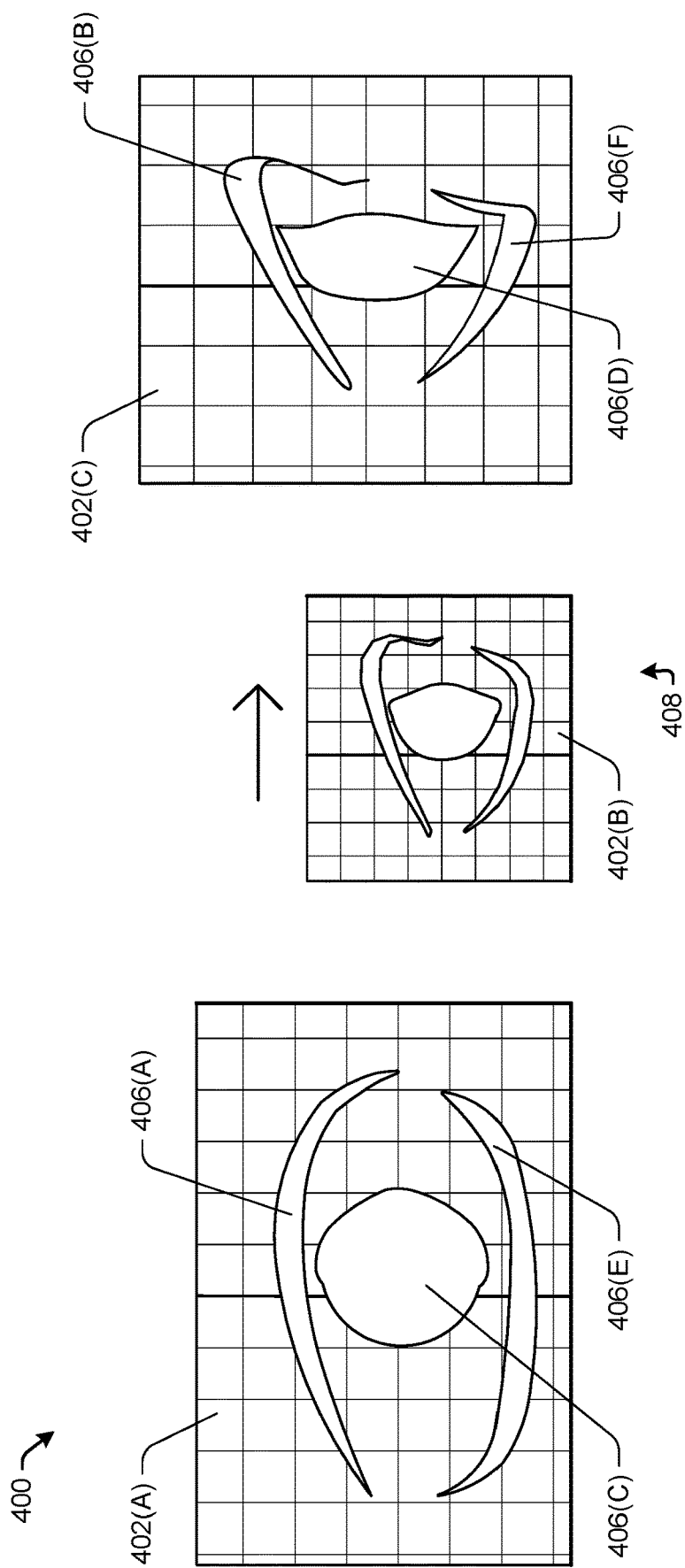
FIG. 4 depicts an example animation feature comprising at least an eye feature formed by one or more line deformations, which may form at least a portion of the system depicted in FIG. 1.

FIG. 4 depicts an example system 400, which may be similar to, identical to, and/or form a portion of any of the systems disclosed herein. For instance, as illustrated by graphical user interface presentations 402(A)-(C), the system 400 may comprise the deformation generating procedure 114, and/or other procedures of the system 100, such as an animation feature datafile generating procedure, which may generate the deformation(s) 116 from the shape(s) 320. In some examples, the system 400 may include and/or generate one or more shapes 320 that form an animated facial feature, such as an animated eye feature.

In some embodiments, the system 400 may comprise one or more shape(s) 320, which may be formed by the line bitmap 308 distorted according to one or more position changes 318 of one or more mesh vertices, as discussed in greater detail above regarding FIGS. 3A and 3B. For instance, the system may include a first shape 406(A) and the second shape 406(B). The first shape 406(A) may comprise a first particular configuration or arrangement, e.g., comprising one or more actuation-based distortions, such as first distortions along the x-axis and the y-axis. The second shape 406(B) may comprise a second particular configuration or arrangement, such as, second distortions along the x-axis and the y-axis. A first deformation may be generated by associating the first shape 406(A) with the second shape 406(B) to generate an appearance of a rotation about the y-axis (e.g., towards or away from a plane defined by the surface).

In some examples, the first deformation, as layered onto the line bitmap 308, may form an animated upper portion of an eye feature, e.g., an upper eyelid, which may be presented as rotating about the y-axis about 60 degrees to about 90 degrees. For instance, the first shape 406(A) may have a first length and the second shape 406(B) may have a second length, the second length being shorter than the first length, e.g., such that the first deformation causes the first shape 406(A) to appear to get shorter as though the upper eyelid is rotating away from a plane of the display.

In some embodiments, the system 400 may include the third shape 406(C) and the fourth shape 406(D). The third shape 406(C) may comprise a third particular configuration or arrangement, e.g., comprising one or more actuation-based distortions, such as undergoing, by way of example, a scaling of −60% along the x-axis. The fourth shape 406(D) may comprise a fourth particular configuration or arrangement, such as, by way of example, the first portion undergoing a scaling of −85% along the x-axis. A second deformation may be generated by associating the third shape 406(C) with the fourth shape 406(D), causing the third shape 406(C) to appear to rotate about the y-axis.

In some examples, the second deformation, as layered onto the line bitmap 308, may form an animated middle portion of an eye feature, e.g., an iris and/or a pupil feature, which may be presented as rotating about the y-axis about 60 degrees to about 90 degrees, for instance, contemporaneously with the upper eyelid feature so as to form, at least partly, an animated eye feature. For instance, the third shape 406(C) may have a third length and the fourth shape 406(D) may have a fourth length, the fourth length being shorter than the first length, e.g., such that the second deformation causes the third shape 406(C) to appear to get shorter as though the iris/pupil is rotating away from the plane of the display.

In some embodiments, the system 400 may include the fifth shape 406(E) and the sixth shape 406(F). The fifth shape 406(E) may comprise a fifth particular configuration or arrangement e.g., comprising one or more actuation-based distortions, such as undergoing, by way of example, a scaling of −60% along the x-axis. The sixth shape 406(F) may comprise a sixth particular configuration or arrangement, such as, by way of example, undergoing a translation of −15% along the x-axis and/or a scaling of −45% along the x-axis. The third deformation may be generated by associating the fifth shape 406(E) with the sixth shape 406(F) and may cause the fifth shape 406(E) to appear to rotate about the y-axis.

In some examples, the third deformation, as layered onto the line bitmap 308, may form an animated bottom portion of the eye feature, e.g., a lower eyelid feature, which may be presented as rotating about the y-axis about 60 degrees to about 90 degrees, for instance, contemporaneously with the upper eyelid feature and/or the middle eyelid feature so as to form, at least partly, the animated eye feature. For instance, the fifth shape 406(E) may have a fifth length and the sixth shape 406(F) may have a sixth length, the sixth length being shorter than the fifth length, e.g., such that the third deformation causes the fifth shape 406(E) to appear to get shorter, as though the lower eyelid is rotating away from the plane of the display. In some examples, the first deformation, the second deformation, and/or the third deformation may be associated together with a particular arrangement (e.g., one or more coordinates of the character model 122 as discussed in greater detail below) that spaces the deformation(s) at least partially apart, such that they form the animated eye feature 410.

In some embodiments, the one or more deformation(s) may create an appearance of the animation feature 102, e.g., a facial feature, moving through three-dimensional space. For instance, the one or more representations of the line bitmap 308 deforming according to the deformations may represent an edge of a feature and/or a shadow indicating a presence of the feature. In some examples, the one or more deformations may represent an upper eyelid, an iris/pupil of an eye, a lower eyelid, a bridge of a nose, an underside of the nose, one or more contours of an ear, an upper lip, a middle edge between lips, a lower lip, a shadow cast by any of the aforementioned features, a background shadow, etc. In some instances, the deformation includes an increase scaling (e.g., an increasing width) that may represent an animated growing shadow and/or a corresponding appearance of the animation feature 102 moving or rotating away from a light source. A decrease scaling (e.g., a decreasing width) may represent an animated shrinking shadow and/or a corresponding appearance of the animation feature 102 moving or rotating toward the light source. One or more actuations (e.g., translating, rotating, and/or scaling) that correspond to the initial shape having a length that is greater than a length of the end shape, may correspond to an appearance of the animation feature 102 rotating about the y-axis. A clockwise rotation (as viewed from a top of the character model 122) may correspond to an actuation of the first portion (e.g., left side) of the line bitmap 308, and/or a counter-clockwise rotation (as viewed from the top) may correspond to an actuation of the third portion (e.g., right side).

The deformation(s) may comprises a sequence of frames including, for instance regarding first deformation, the first shape 406(A) as an initial frame and the second shape 406(B) an as an end frame. In some examples, one or more intermediary frame(s) 408 may be generated, for instance, by the animation generating application 104 based on, for instance, a vector sum or extrapolation that generates transitional frames between the initial frame and the end frame of the deformation(s). The intermediary frame(s) 408 may be generated by calculating a linear equation including the one or more vertices 310 of the first shape 406(A) of the initial frame, and the one or vertices 310 of second shape 406(B) of the end frame, and calculating one or more point(s) at substantially even interval(s) that satisfy the linear equation between the first one or more vertices and the second one or more vertices. The point(s) at substantially even interval(s) may comprise one or more vertices 310 of the intermediary frame(s) 408.

In some instances, the deformation(s) may be stored and utilized in the system 100 independently of a particular image to which the deformation(s) are applied. That is, one or more deformation(s) associated with a first line image having a first line profile may form a first animated facial feature of a first character model version, for example, having a thin, feminine eyebrow feature. A second line image having a second line profile (e.g., that may be different than the first line profile) may replace, e.g., be interchangeable with, the first line image of the first animated facial feature, while maintaining a same arrangement of the one or more deformation(s) of the first animated facial feature, forming a second character model version (e.g., for example having a bushy, masculine eyebrow feature). In some instances, a memory requirement of the system 100 may be reduced by forming multiple character model versions from the arrangement of the one or more deformation(s), while using multiple, in some instances interchangeable, line images having at least partly differing line profiles, e.g., associated line bitmaps 308.

Figure 5:
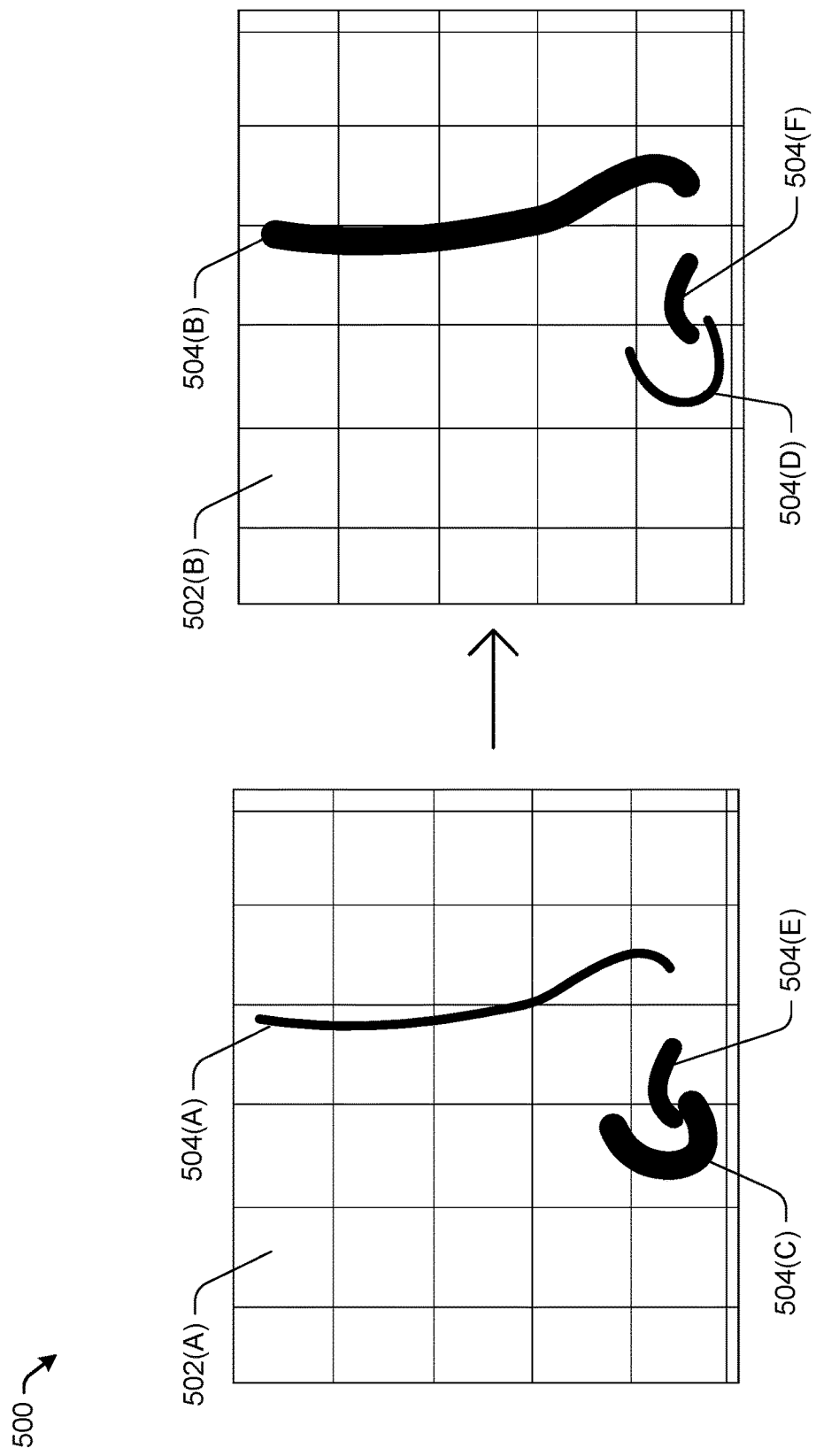
FIG. 5 depicts an example animation feature comprising at least a nose feature formed by one or more line deformations, which may form at least a portion of the system depicted in FIG. 1.

FIG. 5 depict an example system 500, which may be similar to, identical to, and/or form a portion of any of the systems disclosed herein. For instance, as illustrated by graphical user interface presentations 502(A) and 502(B), the system 500 may comprise the deformation generating procedure 114, and/or other procedures of the system 100, such as the animation feature generating procedure, which may generate the deformation(s) 116 from the shape(s) 320. The system 500 may be similar to the system 400, and/or the system 500 may include and/or generate one or more shapes that form an animated facial feature, such as an animated nose feature.

In some examples, the system 500 may include a first shape 504(A), a second shape 504(B), a first deformation of the first shape 504(A) into the second shape 504(B), a third shape 504(C), a fourth shape 504(D), and/or a second deformation of the third shape 504(C) into the fourth shape 504(D), a fifth shape 504(E), a sixth shape 504(F), and/or a third deformation of the fifth shape 504(E) into the sixth shape 504(F), which may generated via any of the methods, operations, and/or procedures disclosed herein.

In some instance, the first shape 504(A) and the second shape 504(B) may include one or more actuations such that the first shape 504(A) and the second shape 504(B), as layered onto the rendered image 110, represents an upper edge of a nose, e.g., a bridge of the nose. The third shape 504(C) and the fourth shape 504(D) may represent an outer lower edge, e.g., an outer nostril edge. The fifth shape 504(E) and the sixth shape 504(F) may represent an inner lower edge, e.g. an inner nostril.

The first deformation may cause the upper edge of the nose to become thicker and/or rotate toward a y-axis, such that the nose appears to tilt downward, and/or the first deformation may cause the upper portion to become thinner and/or rotate away from the y-axis, such that the nose appears to tilt upward. The second deformation and/or the third deformation may contemporaneously cause the outer nostril edge and/or the inner nostril edge to rotate, translate, scale, distort, or otherwise move in a direction to create an appearance of the nose feature tilting and/or rotating in a three-dimensional space.

Figure 6:
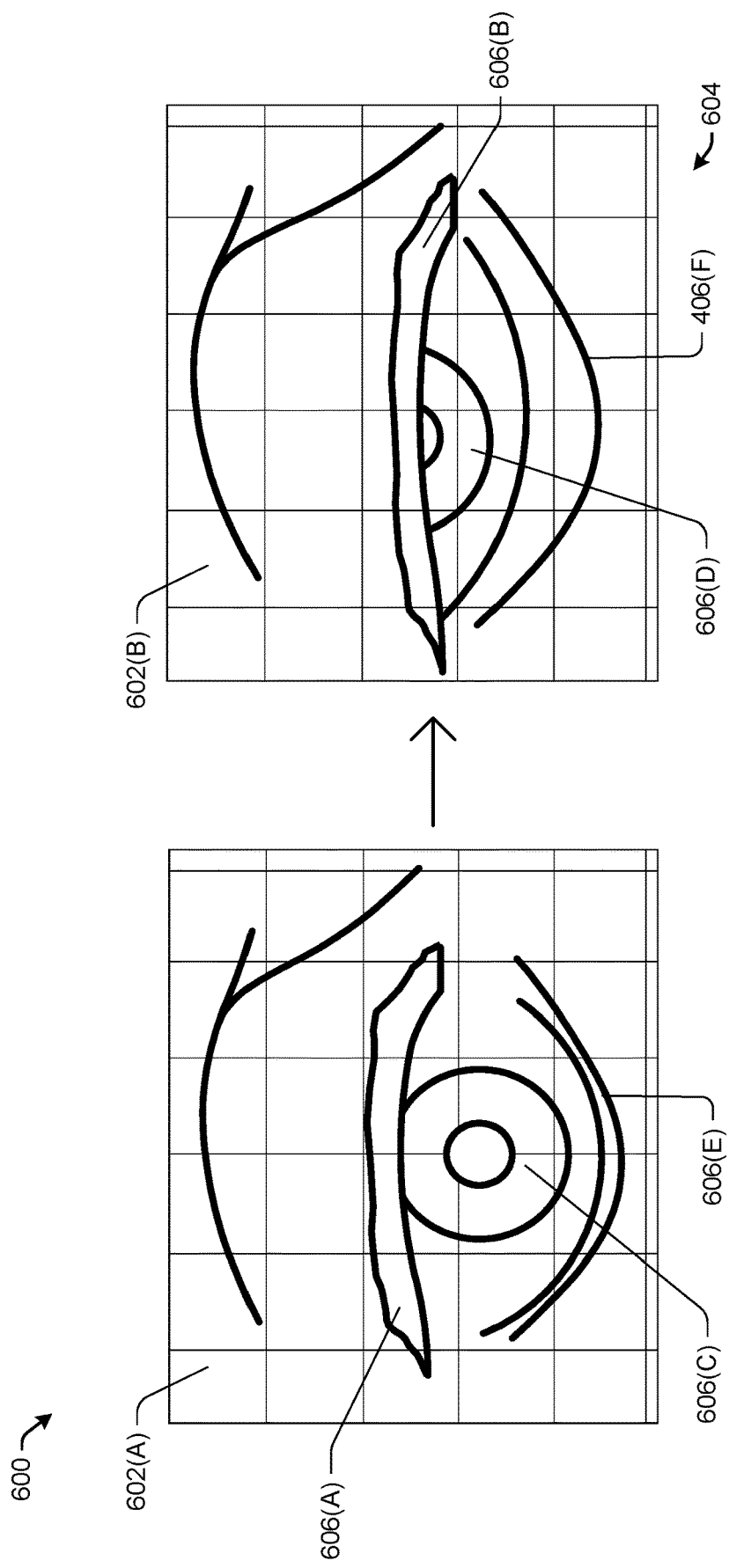
FIG. 6 depicts an example animation feature comprising at least a partially closed eye feature formed by one or more line deformations, which may form at least a portion of the system depicted in FIG. 1.

FIG. 6 an example system 600, which may be similar to, identical to, and/or form a portion of any of the systems disclosed herein. For instance, as illustrated by graphical user interface presentations 602(A) and 602(B), the system 600 may comprise the deformation generating procedure 114, and/or other procedures of the system 100, such as the animation feature generating procedure. The system 600 may, in some instance, generate an animated partially closed eye feature 604.

In some instances, the one or more deformation(s) may generate the animation feature 102 corresponding to a moving facial feature, for instance, indicative of an emotive expression. The animated partially closed eye feature 604 may include one or more shapes 220 representing one or more animated lines discussed above regarding FIG. 4 that form the animated eye feature. Additionally or alternatively, the animated partially closed eye feature 604 may include a first shape 606(A), a second shape 606(B), a third shape 606(C), a fourth shape 606(D), a fifth shape 606(E) and/or a sixth shape 606(F).

In some examples, the first shape 606(A) may represent an upper eyelid of the animated partially closed eye feature 604 in a first expressive position (e.g., similar to shape 406(A)), and the second shape 606(B) may represent the upper eyelid of the animated partially closed eye feature 604 at a second expressive position, e.g., translated a negative value along the y-axis relative to the first shape (that may indicate a tiredness of the character model 122).

In some embodiments, the third shape 606(C) may represent a middle iris/pupil of the animated partially closed eye feature 604 at a third expressive position (e.g., as a circle shape similar to shape 406(C)), and the fourth shape 606(D) may represent the middle iris/pupil of the animated partially closed eye feature 604 at a fourth expressive position (e.g., with a top portion of the iris/pupil scaled a negative value such that the top portion appears truncated by the upper eyelid portion at the second expressive position).

In some examples, the fifth shape 606(E) may represent a lower eyelid of the animated partially closed eye feature 604 at a fifth expressive position (e.g., that may be similar to shape 406(E)), and the sixth shape 606(F) may represent the lower eyelid of the animated partially closed eye feature 604 at a sixth expressive position (e.g., with at least a negative translation value with respect to the fifth shape 606(E)), such that the lower eyelid appears to form a bag under the partially closed eye feature 604.

In some examples, the one or more deformation(s) may generate an appearance of a mouth feature moving (e.g., speaking, smiling, frowning), forehead lines moving (e.g., a furrowed brow), cheek lines moving (e.g., grimacing), and/or other emotive expressions generatable via deformations of shapes, e.g., flat line images, representing an edge or a shadow of the animation feature 102.

Figure 7:
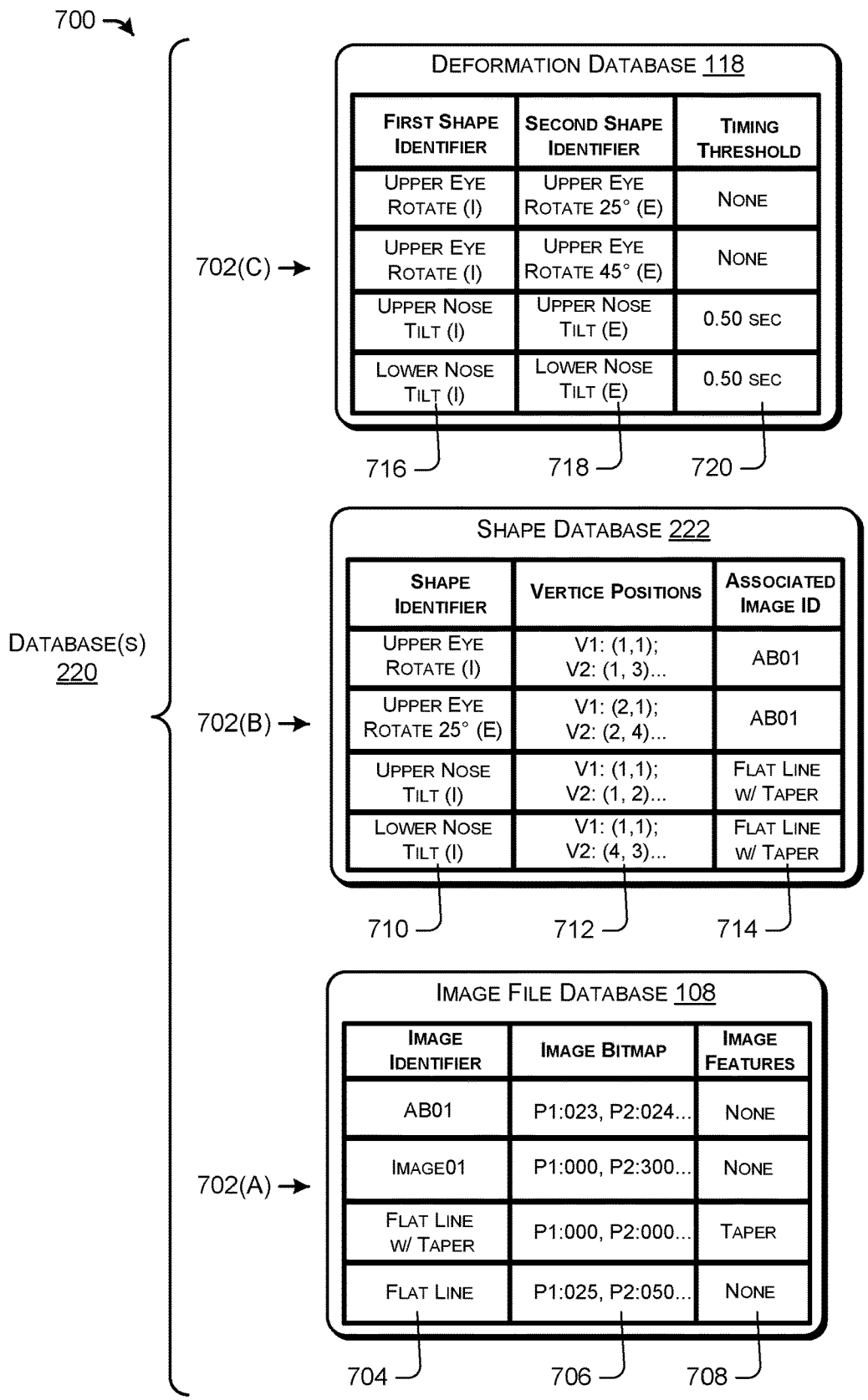
FIG. 7 depicts one or more example database(s), including at least an image file database, a shape database, and/or a deformation database, which may form at least a portion of the system depicted in FIG. 1.

FIG. 7 depicts a system 700 that may be similar to, identical to, and/or form a portion of the system 100. The system 700 may include the one or more database(s) 220, for instance, stored in computer-readable storage media 206, such as the image file database 108, the shape database 222, the deformation database 118, and/or combinations thereof. For instances, the database(s) 220 discussed herein may comprise separate databases, and/or the database(s) 220 discussed herein may at least partially or entirely overlap and/or combine to form a single database. In other words, features discussed with respect to, for instance, the shape database 222, may form part of the deformation database 118, the image file database 108, and/or vice versa.

In some examples, the image file database 108 may receive and store one or more image file(s) 106. The image file(s) 106 may comprise an image file type, such as a PNG, JPEG, JFIF, TIFF, GIF, BMP, or another file type that may represent one or more pixel values associated with one or more pixel locations. In some instances, the image file(s) 106 may be received at the image file database 108 via an uploading of the image file(s) 106 to the animation generating application 104. The image file(s) 106 may comprise data that is extracted, parsed, and/or otherwise converted into a retrievable data structure of the image file database 108, as represented by example spreadsheet 702(A). For instance, the animation generating application 104 may extract data of the image file(s) 106 such as an image identifier 704, an image bitmap 706 (e.g., line bitmap 308), and/or one or more image feature(s) 708.

The image identifier 704 may comprise a unique identifier, e.g., string of alphanumeric and/or ASCII symbols to represent a name of the data associated with the image file 106. Examples of image identifier 704 may be "AB01," "Image01," "Flat Line Image," "Flat Line Image With Taper," or any other string associated with the data, e.g., upon creation of the image file 106 or renaming the image file 106. In some examples, the image identifier 704 may be associated with the particular memory location of the computer-readable storage media, such that the mage identifier 704 may comprise a link between the data of the image file 106 and the particular memory location so that when the image identifier 704 is called by an executing algorithm, the system 700 accesses the data stored at the particular memory location.

The image bitmap 706 may comprise data indicating a particular mapping of pixel values to particular pixel locations, e.g., of the graphical user interface 216 on display 208 or another display presenting the animation feature 102. For instance, the image bitmap 706 may represent shapes, lines, and/or colors of an image as presented when the image file 106 is displayed, e.g., to a human user. In some instance, the image bitmap 706 may represent a shape of a line, such that the image bitmap 706 comprises a line bitmap 308, as discussed in greater detail above.

The one or more image feature(s) 708 may comprise additional features that form the image represented by the image file 106, which may be layered onto the image bitmap 706. For instance, the one or more image feature(s) 708 may comprise a taper feature, which creates a diminishing width at an end of the line bitmap 308, e.g., by changing one or more pixel values of the line bitmap 308 at the end. In some instances, the taper feature (or other features of the one or more image feature(s)) may be incorporated into the image bitmap 706 or may form a portion of the image bitmap 706, rather than being layered onto the image bitmap 706 separately. The line bitmap 308 may comprise a first taper at a first end and a second taper at the second end. In some instances, the first taper may differ in shape (e.g., rounded end, pointed end, flat end, etc.), length, end-point angle, and/or symmetry with regard to the second taper, or the first taper may be similar or identical to the second taper.

In some embodiments, the shape database 222 may receive and store one or more shape datafile(s) e.g., representing one or more shape(s). The shape datafile(s) may be received at the shape database 222 as an output of the shape generating procedure. The shape datafile(s) may comprise extractable data that may be stored as a retrievable data structure in the shape database, as represented by example spreadsheet 702(B). For instance, data of the shape datafile (s) may include a shape identifier 710, vertices positions 712, and/or an associated image identifier 714.

The shape identifier 710 may comprise a unique identifier, e.g., string of alphanumeric and/or ASCII symbols to represent a name of the data associated with the shape datafile. Examples of shape identifiers may be "Lisa upper eyelid rotating 90 degrees," "upper nose idle mode," or any other string associated with the data, e.g., upon initiation of the shape generating procedure via the animation generating application 104, or upon renaming the shape datafile.

The vertices positions 712 may comprise data (e.g., a data list) indicating one or more vertices positions (e.g., x-y coordinates) that represent a particular vertices positioning arrangement, for instance, generated by multiple actuations of one or more control elements. In some instances, the vertices positions 712 may be generated by another source other than multiple actuations. The vertices positions 712 may be associated with the shape identifier.

The associated image identifier(s) 714 may comprise an identifier indicating the image file 106 associated with the shape datafile. For instance, an associated image file 106 indicated by the associated image identifier(s) 714 may comprise the image file 106 that was rendered in order to generate the shape datafile. The associated image identifier(s) 714 may indicate a particular image file that comprises one or more dimensions that are less than one or more dimensions of the vertices positions 712, such that the vertices positions 712 at least partially surround the particular image. In other words, the shape datafile may comprise vertices positions 712 arranged to fit around an image bitmap 706 of the particular image file indicated by the associated image identifier(s) 714.

In some examples, the deformation database 118 may receive and store one or more deformation datafiles, e.g., as an output of the deformation generating procedure 114. The deformation datafile(s) may comprise extractable data that may be stored as a retrievable data structure in the deformation database 118, as represented by example spreadsheet 702(C). For instance, data of the deformation datafile(s) may include a first shape identifier 716, a second shape identifier 718, and/or a timing threshold 720.

The first shape identifier 716 may be associated with a first shape and the second shape identifier 718 may be associated with a second shape. The first shape and/or the second shape may be stored in and/or retrieved from the shape database 222. The first shape identifier 716 may indicate that the first shape comprises the initial shape of the deformation represented by the deformation datafile, and the second shape identifier 718 may indicate that the second shape comprises the end shape. Accordingly, a particular, single shape (e.g., stored in the shape database 222) may comprise multiple initial shapes of multiple deformations and/or multiple end shapes of multiple deformations. In other words, one or more shapes may be accessed multiple times to generate multiple deformations.

The timing threshold 720 may indicate a duration of time for the deformation represented by the deformation datafile to occur, i.e., for the initial shape to deform into the end shape. The timing threshold 720 may indicate a number of milliseconds, seconds, minutes, and/or hours. In some instances, the timing threshold 720 may be omitted from the deformation database 118, such that the deformation 118 may occur independently of a particular duration and/or the duration may be provided after the animation feature 102 is generated from the deformation, e.g., by the graphics engine 128. The deformation database 118 may store one or more deformation identifier(s) (e.g., alphanumeric string values) associated with the one or more deformation(s) 116, for instance, to locate and/or retrieve the one or more deformation(s) 116 from the computer-readable storage media 206.

The one or more database(s) 220 may comprise one or more of a comma delimited list, a spreadsheet, an array, a NoSQL data structure, a hash-based data structure, an object-based data structure, or any other data type, data structure, and/or data system for storing retrievable data in memory.

Figure 8:
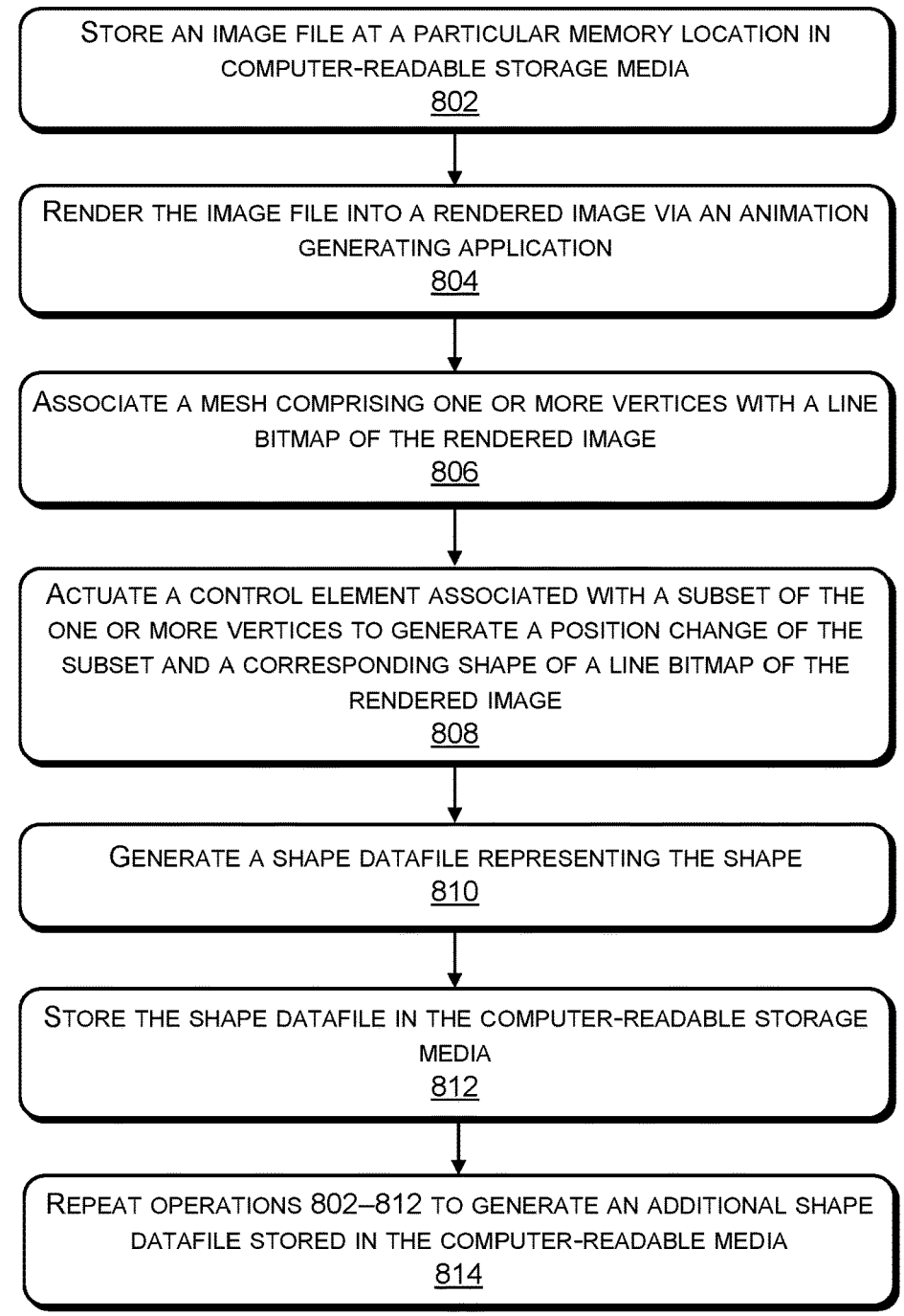
FIG. 8 depicts one or more example operations for associating a mesh with a rendered image that may be performed by the system of FIG. 1.

FIG. 8 depicts a system 800 including one or more operation(s) that may be performed by any of the systems discussed herein. In some instances, one or more of the operation(s) of system 800 may generate the animated line 120, which may form a portion of the animation feature 102. Any of the operations of system 800 may be initiated by the user input 112, by other components of the system 100 (e.g., the animation generating application 104), or by combinations thereof.

At operation 802, the system 800 may store an image file 106, e.g., a line image file at a particular memory location of the computer-readable storage media. For instance, the line image file may be generated via a drawing application and/or a drawing feature of the animation generating application. The line image file may be stored such that it is retrievable by the animation generating application, for instance, during the deformation generating procedure and/or to generate the animated line.

At operation 804, the system 800 may render the image file 106 into a rendered image 110 via the animation generating application 104. For instance, a graphics card of the computing device 202 may render a two-dimensional image of a line and display the rendered image 110 on the graphical user interface 216 associated with the animation generating application 104. The rendered image 110 may provide a visual presentation of the line bitmap 308 represented by the image file 106, as well as visual presentation(s) of control element actuations, and/or other the steps of the deformation generating procedure 114.

At operation 806, the system 800 may associate a mesh 306 comprising the one or more vertices 310 with a line bitmap 308 of the rendered image 110. For instance, a mesh boundary box may be layered onto the rendered line image, such that position changes 318 of the one or more vertices 310 cause a corresponding distortion to the line bitmap 308. The position changes 318 may be in response to receiving a user input, and/or in response to another application in communication with the animation generating application.

At operation 808, the system 800 may actuate a control element 312 associated with a subset 314 of the one or more vertices 310 to generate a position change 318 of the subset 314, and a corresponding shape 320 of a line bitmap 308 of the rendered image 110. For instance, the control element 312 may be actuated via the rotation actuation 322, the translation 324 actuation, the scaling actuation 326, or combinations thereof.

At operation 810, the system 800 may generate a shape datafile representing the shape. For instance, one or more vertices coordinate values that correspond to the one or more actuations of the mesh 306 may be converted into a digital format and outputted, e.g., to the computer-readable storage media 206. In some examples, the shape datafile may be generated in response to receiving, via the graphical user interface 216, the user input 112 that initiates a shape exporting procedure.

At operation 812, the system 800 may store the shape datafile in a computer-readable storage media 206. For instance, the system 800 may store the shape datafile in the shape datafile database 222 as discussed in greater detail above regarding FIG. 7. The one or more vertices coordinate values 712 may be extracted from the shape datafile and stored as a data value entry in the shape database 222.

At operation 814, the system 800 may repeat operations 802-812 to generate and store an additional shape datafile in the computer-readable storage media.

Figure 9:
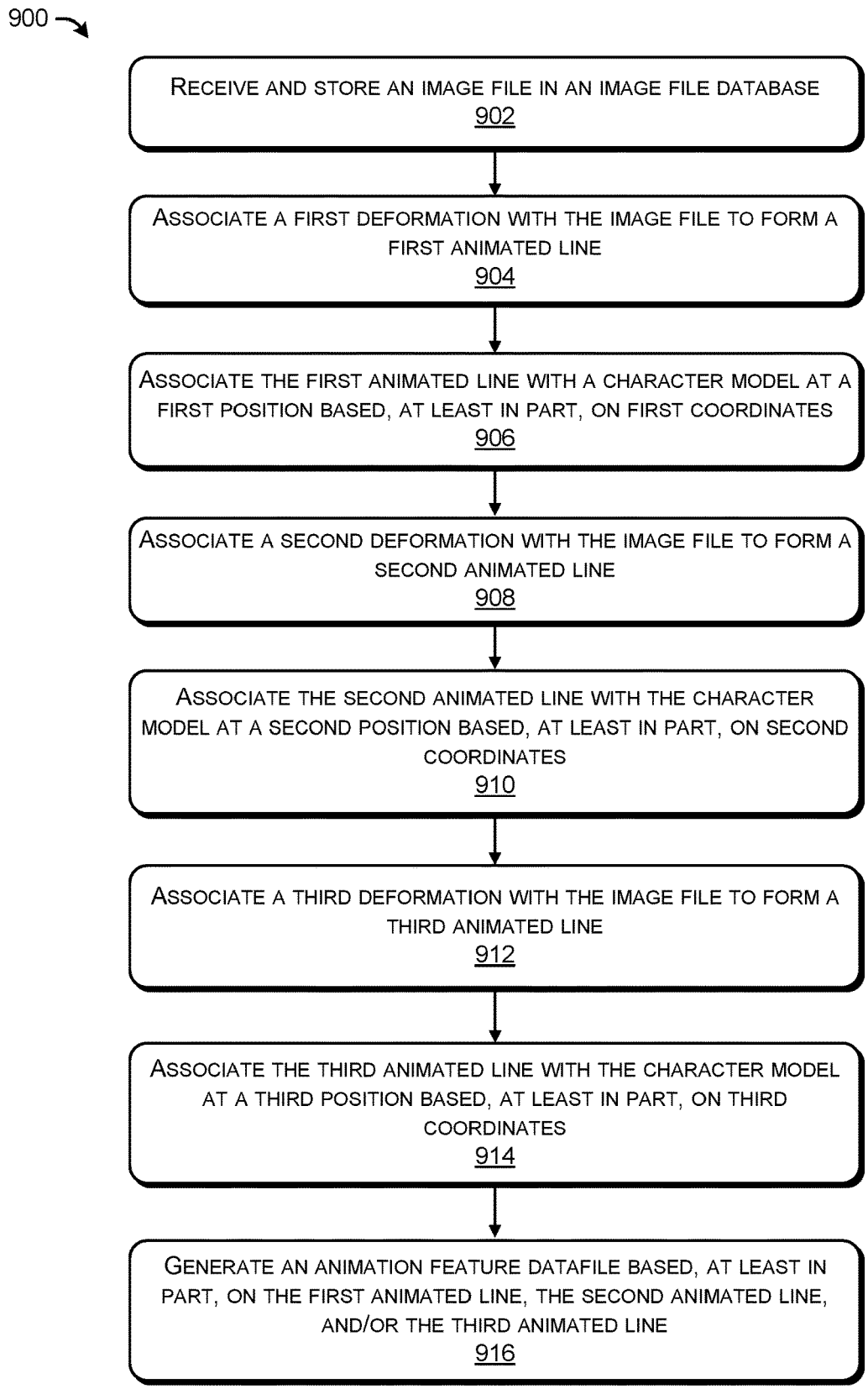
FIG. 9 depicts one or more example operations for generating one or more shapes from a mesh associated with a rendered image that may be performed by the system of FIG. 1.

FIG. 9 depicts a system 900 including one or more operation(s) that may be performed by any of the systems discussed herein. In some instances, one or more of the operation(s) of system 900 may generate the animation feature 102 by generating one or more deformations 116 from the one or more deformation datafiles and one or more image file(s) 106. Any of the operations of system 900 may be initiated by the user input 112, by other components of the system 100 (e.g., the animation generating application 104), or by combinations thereof.

At operation 902, the system 900 may receive and store an image file 106. For instance, the system 902 may receive the image file representing a flat line from the image file database 108, e.g., from the particular memory location at which the image file 106 is stored in computer-readable storage media 206 storing the image file database 108. As discussed in greater detail above regarding FIG. 7, the flat line image file may comprise a file type of one or more of a JPEG, JFIF, TIFF, GIF, BMP, PNG, or another file type that may represent one or more pixel values associated with one or more pixel locations.

At operation 904, the system 900 may associate a first deformation with the image file 106 to form a first animated line. For instance, the system 900 may receive a first shape datafile from the shape database 222 and a second shape datafile from the shape database 222. The system 900 may associated the first shape datafile and the second shape datafile with the line image file such that, upon execution by the graphics engine 128, a line bitmap 308 of the image file 106 is displayed as deforming from a first shape into a second shape.

At operation 906, the system 900 may associate the first animated line with a character model 122 at a first position on the character model 122 based, at least in part, on first coordinates. For instance, the image file 106 and first deformation of the animated line may, by way of example, be positioned on the character model 122 to represent the top portion of the eye (e.g., an upper eyelid) rotating about a y-axis and, accordingly, the first coordinates may correspond to an upper side portion of a face of the character model 122, e.g., an upper eyelid position.

At operation 908, the system 900 may associate a second deformation with the image file 106. For instance, the system 900 may receive a third shape datafile from the shape database 222 and a fourth shape datafile from the shape database 222. The system 900 may associated the third shape datafile and the fourth shape datafile with the image file 106 such that, upon execution by the graphics engine 128, the line bitmap 308 of the image file 106 is displayed as deforming from the third shape into the fourth shape.

At operation 910, the system 900 may associate the second animated line with the character model 122 at a second position on the character model 122 based, at least in part, on second coordinates. For instance, the image file 106 and the second deformation of the second animated line may, by way of example, represent the middle portion of the eye (e.g., an iris and/or pupil) rotating about the y-axis and, accordingly, the second coordinates may correspond to an upper side portion of the character model's face, e.g., an iris/pupil position spaced at least partially below the upper eyelid position.

At operation 912, the system 900 may associate a third deformation with the image file 106. For instance, the system 900 may receive a fifth shape datafile from the shape database 222 and a sixth shape datafile from the shape database 222. The system 900 may associated the fifth shape datafile and the sixth shape datafile with the image file 106 such that, upon execution by the graphics engine 128, the line bitmap 308 of the image file 106 is displayed as deforming from the fifth shape into the sixth shape.

At operation 914, the system 900 may associate the third animated line with the character model 122 at a third position on the character model 122 based, at least in part, on third coordinates. For instance, the image file 106 and third deformation forming the third animated line may, by way of example, represent the bottom portion of the eye (e.g., a lower eyelid) rotating about the y-axis and, accordingly, the second coordinates may correspond to an upper side portion of the face of the character model 122, e.g., a lower eyelid position spaced at least partially below the upper eyelid position and/or the iris/pupil position.

At operation 916, the system may generate an animation feature datafile 126 based, at least in part, on the first animated line, the second animated line, and/or the third animated line. For instance, the animation feature datafile 126 may be generated from the image file 106 (e.g., representing the line bitmap 308), the one or more deformations 110 (e.g., the first deformation, the second deformation, and/or the third deformation), and the association of the one or more deformations to one or more coordinates (e.g., the first coordinates, the second coordinates, and/or the third coordinates) on the character model 122, and/or some other data representing a spatial relation between the first animated line, the second animated line, and/or the third animated line. The animation feature datafile 126 may comprise, by way of example, a JSON datafile. The animation feature datafile 126 may be executed by the graphics engine 128, which may result in the animation feature 102 represented by the animation feature datafile 126 being displayed as a rendered animation, such that the animation feature 102 appears to move in a three-dimensional animated space.

Although FIGS. 8 and 9 illustrate example operations, the described operations in these figures (and other methods, procedures, and operations disclosed herein) may be performed in other orders different than those illustrated in FIGS. 8 and 9, and multiple steps may be performed simultaneously or in parallel. For instance, a plurality of shapes may be generated via operation 808, and a plurality of portions of the line bitmap 308 may be distorted via a plurality of actuations of a plurality of control elements. Furthermore, in some embodiments, one or more operations illustrated in FIGS. 8 and 9 may be omitted, repeated, and/or combined with other operations illustrated in FIGS. 8 and 9, or any other operations and components discussed in this disclosure. For instance, operation 808 may be omitted, e.g., wherein a shape is provided by another application rather than the user input 112 actuating the control element. In some instances, the operations illustrated in FIGS. 8 and 9 may be performed in multiple iterations for instance, to generate dozens, hundreds, or even thousands of animation features 102 based on line deformations.

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A method for generating an animation feature from animated lines, the method comprising:
generating a first animated line by:
associating a first mesh with a flat line image, the first mesh including a first boundary and a first plurality of vertices distributed along the first boundary;
receiving, via a graphical user interface, a first actuation of a first control element associated with one or more first vertices of the first plurality of vertices to generate a first position change of the one or more first vertices and to generate a first shape of the flat line image from the first position change;
receiving, via the graphical user interface, a second actuation of the first control element to generate a second position change of the one or more first vertices and to generate a second shape of the flat line image from the second position change; and
storing, in a computer-readable storage media, a first datafile representing a first deformation comprising the first shape deforming into the second shape;
generating a second animated line by:
associating a second mesh with the flat line image, the second mesh including a second boundary and a second plurality of vertices distributed along the second boundary;
receiving, via the graphical user interface, a third actuation of a second control element associated with one or more second vertices of the second plurality of vertices to generate a third position change of the one or more second vertices and to generate a third shape of the flat line image from the third position change;
receiving, via the graphical user interface, a fourth actuation of the second control element to generate a fourth position change of the one or more second vertices and to generate a fourth shape of the flat line image from the fourth position change; and
storing, in the computer-readable storage media, a second datafile representing a second deformation comprising the third shape deforming into the fourth shape;
associating the first animated line with one or more first coordinates of a character model presented in a developer preview window of a graphical user interface; and
associating the second animated line with one or more second coordinates of the character model such that the second animated line is at least partially spaced apart from the first animated line.

2. The method of claim 1, wherein the flat line image comprises a first end and a second end, and at least one of the first end or the second end includes a taper.

3. The method of claim 1, wherein, prior to associating the first mesh with the flat line image, the method further comprises:
generating, via a drawing application, an image file; and
rendering, via an animation application, the image file into the flat line image.

4. The method of claim 1, wherein the one or more first coordinates and the one or more second coordinates are arranged such that the first animated line and the second animated line form an animated facial feature of the character model.

5. The method of claim 1, further comprising determining a third datafile, stored in the computer-readable storage media, representing the flat line image at a particular memory location of the computer-readable media, and wherein generating the first animated line and generating the second animated line includes accessing the particular memory location.

6. The method of claim 1, wherein the one or more first vertices comprise a first subset of the first plurality of vertices, and generating the first animated line further comprises:
receiving, via the graphical user interface, a fifth actuation of a third control element associated with a second subset of the first plurality of vertices to generate a fifth position change of the second subset and to generate a fifth shape of the flat line image that includes the first position change and the fifth position change; and
receiving, via the graphical user interface, a sixth actuation of a fourth control element associated with a third subset of the first plurality of vertices to generate a sixth position change of the third subset and to generate a sixth shape of the flat line image that includes the first position change, the fifth position change, and the sixth position change.

7. The method of claim 1, further comprising:
generating a third animated line by:
associating a third mesh with the flat line image, the third mesh including a third boundary box and a third plurality of vertices distributed along the third boundary box;
receiving, via the graphical user interface, a fifth actuation of a third control element associated with one or more third vertices of the third plurality of vertices to generate a fifth position change of the one or more third vertices, and to generate a fifth shape of the flat line image from the fifth position change;
receiving, via the graphical user interface, a sixth actuation of the third control element to generate a sixth position change of the one or more third vertices, and to generate a sixth shape of the flat line image from the sixth position change; and
storing, in the computer-readable storage media, a third datafile representing a third deformation comprising the fifth shape deforming into the sixth shape; and
associating the third animated line with one or more third coordinates of the character model at least partially spaced apart from the first animated line and the second animated line, such that the first animated line, the second animated line, and the third animated line form one of an animated eye feature, an animated nose feature, or an animated mouth feature.

8. The method of claim 2, further comprising:
executing, via a graphics engine, an animation action comprising the first animated line deforming according to the first deformation contemporaneously with the second animated line deforming according to the second deformation, such that the animated facial feature appears to move in a three-dimensional space.

9. A system comprising:
memory;
one or more processors; and
one or more computer-executable instructions stored in the memory and executable by the one or more processors to perform operations comprising:
determining a first animated line comprising:
a flat line image; and
a first deformation associated with the flat line image, the first deformation comprising a first shape of the flat line image deforming into a second shape of the flat line image;
determining a second animated line comprising:
the flat line image; and
a second deformation associated with the flat line image, the second deformation comprising a third shape of the flat line image deforming into a fourth shape of the flat line image;
determining a first association of the first animated line with a character model at one or more first coordinates; and
determining a second association of the second animated line with the character model at one or more second coordinates that are at least partially spaced apart from the first coordinates.

10. The system of claim 9, wherein the first deformation and the second deformation are defined by one or more position changes of a plurality of vertices of a mesh associated with the flat line image.

11. The system of claim 9, wherein at least one of the first animated line or the second animated line comprises a tapered end.

12. The system of claim 9, wherein the first animated line represents a first shadow, and the second animated line represents a second shadow, such that the first deformation and the second deformation create an appearance of an animated facial feature moving in a three-dimensional space.

13. The system of claim 9, wherein the first animated line represents a shadow or an edge of a bridge of a nose of the character model, and the second animated line represents a shadow or an edge of an underside of the nose.

14. The system of claim 9, wherein the first animated line represents a shadow or an edge of an upper eyelid of the character model, and the second animated line represents a shaded area or an edge of a middle portion of an eye of the character model.

15. The system of claim 9, wherein the first animated line represents a shadow or an edge of an upper lip of the character model or a lower lip of the character model, and the second line represents a shadow or an edge between the upper lip and the lower lip.

16. The system of claim 9, wherein the flat line image comprises a first flat line image having a first profile, and further comprising a second flat line image having a second profile that is different than the first profile, the second flat line image being interchangeable with the first flat line image in the first animated line and the second animated line.

17. A method comprising:
determining a first animated line positioned at first coordinates on a character model, the first animated line including a first deformation of a flat line image deforming from a first shape into a second shape;
determining a second animated line positioned at second coordinates on the character model that are different from the first coordinates, the second animated line including a second deformation of the flat line image deforming from a third shape into a fourth shape; and
determining a third animated line positioned at third coordinates on the character model that are different from the second coordinates and the first coordinates, the third animated line including a third deformation of the flat line image deforming from a fifth shape into a sixth shape.

18. The method of claim 17, wherein the first deformation is determined based at least in part on:
determining one or more arrangements of one or more vertices, stored in a computer-readable storage media, associated with the first shape or the second shape.

19. The method of claim 18, wherein the animation feature comprises an animated eye, and wherein:
the first animated line forms an upper portion of the animated eye;
the second animated line forms a middle portion of the animated eye; and
the third animated line forms a lower portion of the animated eye.

20. The method of claim 19, wherein:
the first shape comprises a first length of the first animated line;
the second shape comprises a second length of the first animated line that is less than the first length;
the third shape comprises a third length of the second animated line;
the fourth shape comprises a fourth length of the second animated line that is less than the third length;
the fifth shape comprises a fifth length of the third animated line; and
the sixth shape comprises a sixth length of the third animated line that is less than the fifth length.

\* \* \* \* \*